United States Patent
Okazaki (10) Patent No.: US 8,098,670 B2
(45) Date of Patent: Jan. 17, 2012

(54) XDSL ACCOMMODATION APPARATUS, MULTICAST DISTRIBUTION SYSTEM, AND DATA DISTRIBUTION METHOD

(75) Inventor: Kenichi Okazaki, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 2129 days.

(21) Appl. No.: 10/227,808

(22) Filed: Aug. 27, 2002

(65) Prior Publication Data

US 2003/0053458 A1    Mar. 20, 2003

(30) Foreign Application Priority Data

Aug. 27, 2001 (JP) ................................ 2001-255799

(51) Int. Cl.
*H04L 12/28* (2006.01)
*H04L 12/56* (2006.01)
(52) U.S. Cl. ....................................................... 370/401
(58) Field of Classification Search .................. None
See application file for complete search history.

(56) References Cited

U.S. PATENT DOCUMENTS

| | | | | |
|---|---|---|---|---|
| 5,586,290 A * | 12/1996 | Hirai et al. | ..................... | 711/113 |
| 5,940,594 A | 8/1999 | Ali et al. | | |
| 6,453,385 B1 * | 9/2002 | Sturges et al. | ................ | 711/129 |
| 6,542,964 B1 * | 4/2003 | Scharber | ........................ | 711/122 |
| 6,751,218 B1 * | 6/2004 | Hagirahim et al. | ............ | 370/390 |
| 6,760,765 B1 * | 7/2004 | Asai et al. | ..................... | 709/226 |
| 6,771,673 B1 * | 8/2004 | Baum et al. | ................... | 370/535 |
| 6,788,696 B2 * | 9/2004 | Allan et al. | .................... | 370/411 |
| 7,003,726 B2 * | 2/2006 | Walker et al. | ................. | 715/717 |
| 7,146,430 B2 * | 12/2006 | Kobayashi | .................... | 709/238 |
| 7,457,850 B1 * | 11/2008 | Ukigawa et al. | .............. | 709/219 |
| 2001/0052015 A1 * | 12/2001 | Lin et al. | ........................ | 709/226 |
| 2002/0147849 A1 * | 10/2002 | Wong et al. | ................... | 709/246 |
| 2002/0198953 A1 * | 12/2002 | O'Rourke et al. | ............ | 709/213 |
| 2003/0058827 A1 * | 3/2003 | Chow et al. | ................... | 370/338 |

OTHER PUBLICATIONS

R. Craioveanu; The Benefits of IP Multicast Over DSL; http://www.nwfusion.com/news/tech/0207tech.html; Jul. 2, 2000; 2 pages.
Kikuchi Takahashi; Internet Technology; The new service provided by a cache server; Interop Magazine; 200-9; Sep. 2000; 10 pages. (Translation of article only—14 pages).
I.R. Craioveanu, "The benefits of IP multicast over DSL", Network World Fusion, Jul. 2, 2000, http://www.nwfusion.com/news/tech/0207tech.html.
K. Kikuchi, Internet Technology, New Services Provided by Cache Servers, INTEROP Magazine, Sep. 1, 2000, vol. 10, No. 9, pp. 156-161.

* cited by examiner

*Primary Examiner* — Ayaz Sheikh
*Assistant Examiner* — Blanche Wong
(74) *Attorney, Agent, or Firm* — Harrity & Harrity, LLP (57) ABSTRACT

An xDSL accommodation apparatus includes an xDSL interface, exchange switch, and cache server. The xDSL interface interfaces an xDSL (any types of Digital Subscriber Line) to which each of a plurality of clients is connected. The exchange switch exchanges a packet transmitted/received between a content server and a client. The cache server temporarily stores a content received from the content server through a network. The cache server includes a copy/distribution section. The copy/distribution section copies and distributes the stored content to distribute the same content to the plurality of clients. A multicast distribution system and data distribution method are also disclose.

19 Claims, 11 Drawing Sheets

XDSL ACCOMMODATION APPARATUS, MULTICAST DISTRIBUTION SYSTEM, AND DATA DISTRIBUTION METHOD

BACKGROUND OF THE INVENTION

The present invention relates to an xDSL (any types of Digital Subscriber Line) accommodation apparatus, multicast distribution system, and data distribution method, which can avoid waste of the band of a relay line used to distribute a live content and reduce the installation cost of live content distribution.

Along with the recent remarkable development of the Internet, not only E-mail (Electronic mail) or WWW (World Wide Web) browsers but also broadcast-type live content stream distribution services are also appearing. This is mainly due to the advent of broadband access means represented by xDSL. However, conventional methods used for broadcast-type live content stream distribution services for xDSL subscribers, i.e., a general content download method, a method using IP (Internet Protocol) multicast, and a method of using a splitter have the following problems.

Figure 10:
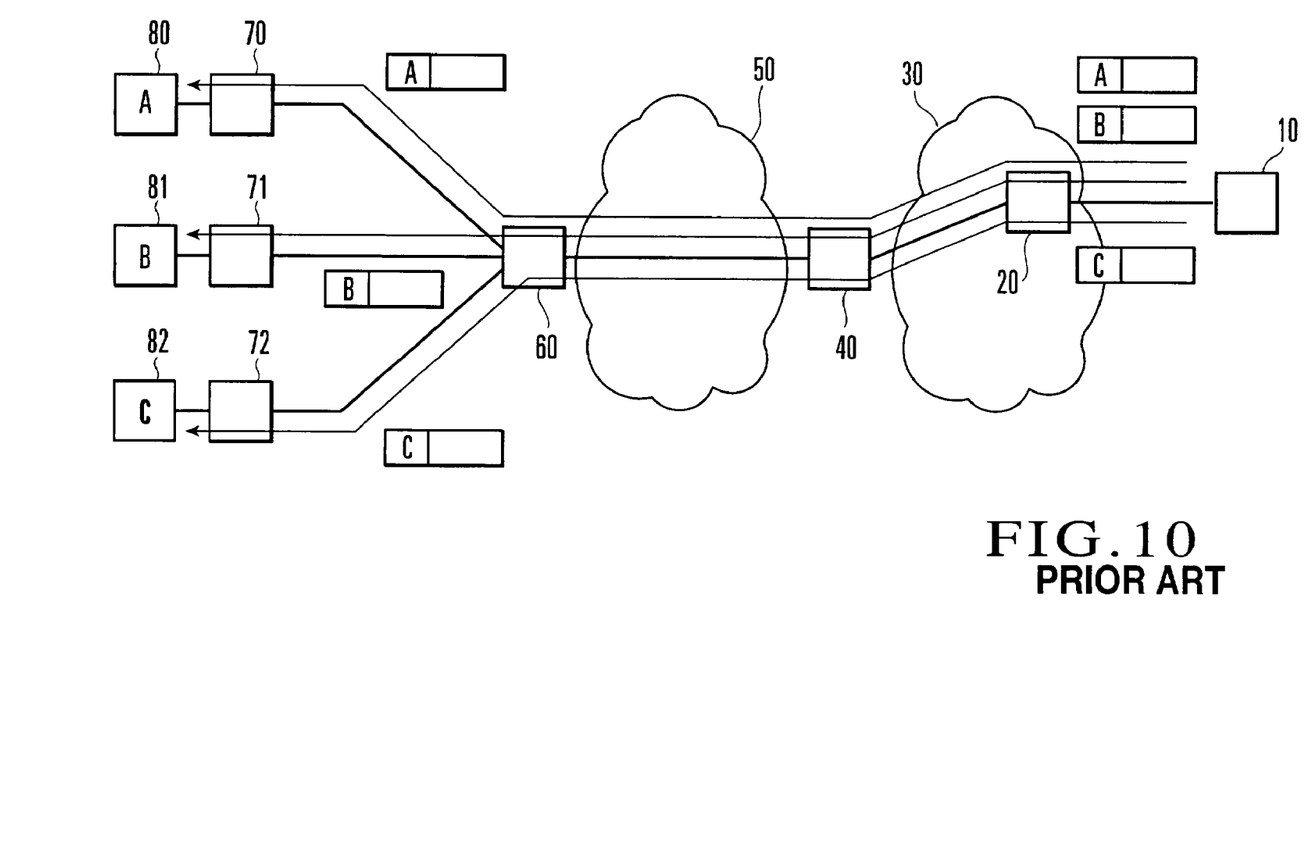
FIG. 10 is view showing a conventional data distribution system.

A conventional distribution system used not only for content download but also for stream distribution will be described with reference to FIG. 10. A Web server 10 individually distributes live contents having the same contents to a client (A) 80, client (B) 81, and client (C) 82 as packet data. The live contents are distributed from a router 20 to the clients 80 to 82 through an IP network 30, BAS (Broadband Access Server) 40, ATM (Asynchronous Transfer Mode) access network 50, xDSL accommodation apparatus 60, and xTU-Rs (any types of Transmission Unit Remotes) 70, 71, and 72. In this distribution system, the band of the relay line from the router 20 to the BAS 40, ATM access network 50, and xDSL accommodation apparatus 60 through the IP network 30 is wasted.

Figure 11:
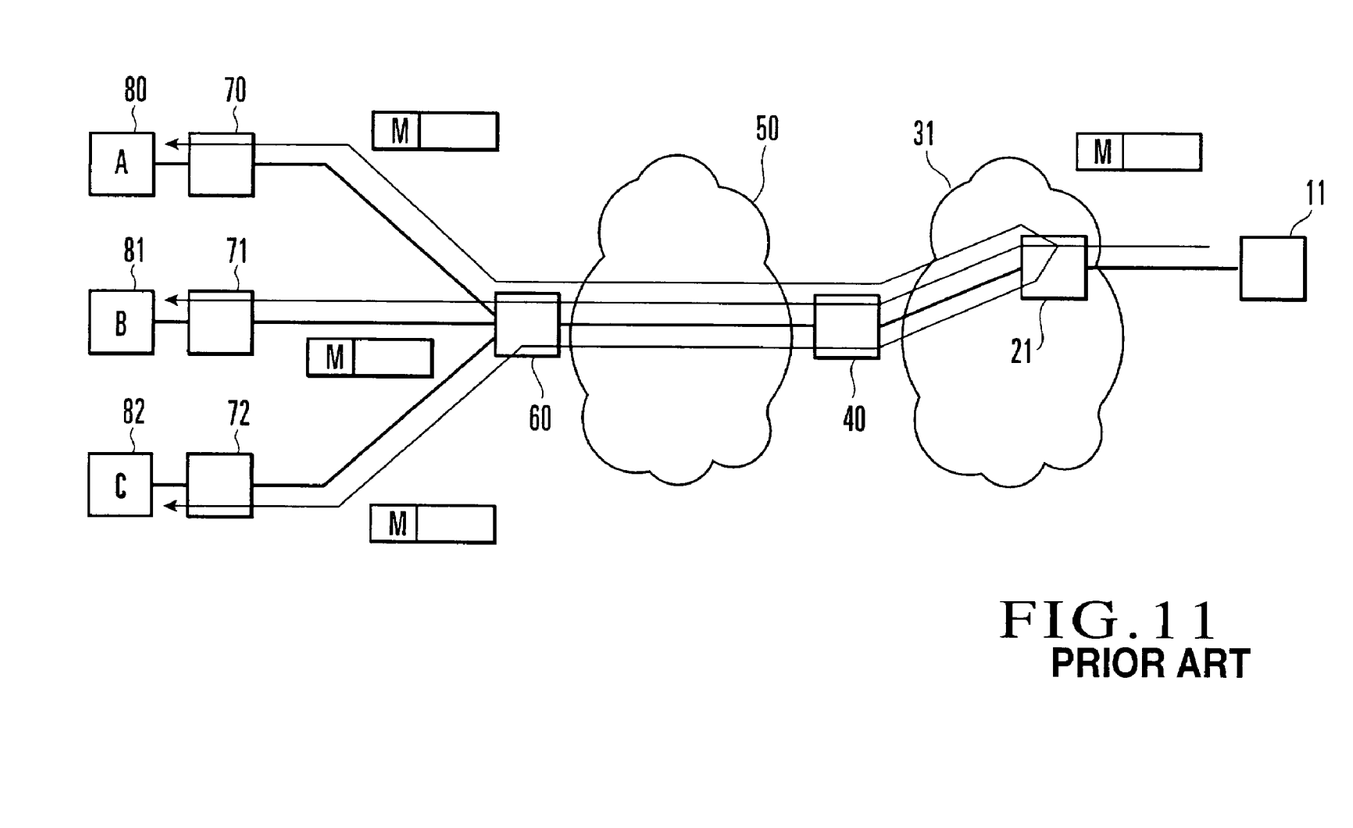
FIG. 11 is a view showing a conventional IP multicast distribution system.

In a conventional IP multicast distribution system shown in FIG. 11, a router 21 and IP network 31 cope with multicast. A content server 11 only needs to transmit a signal packet having an M (multicast) address. In this scheme, the configuration becomes complex because the router 21 and IP network 31 on the route must cope with multicast. In addition, the problem that the band of the relay line up to a BAS 40, ATM access network 50, and xDSL accommodation apparatus 60 is wasted is not solved.

Figure 12:
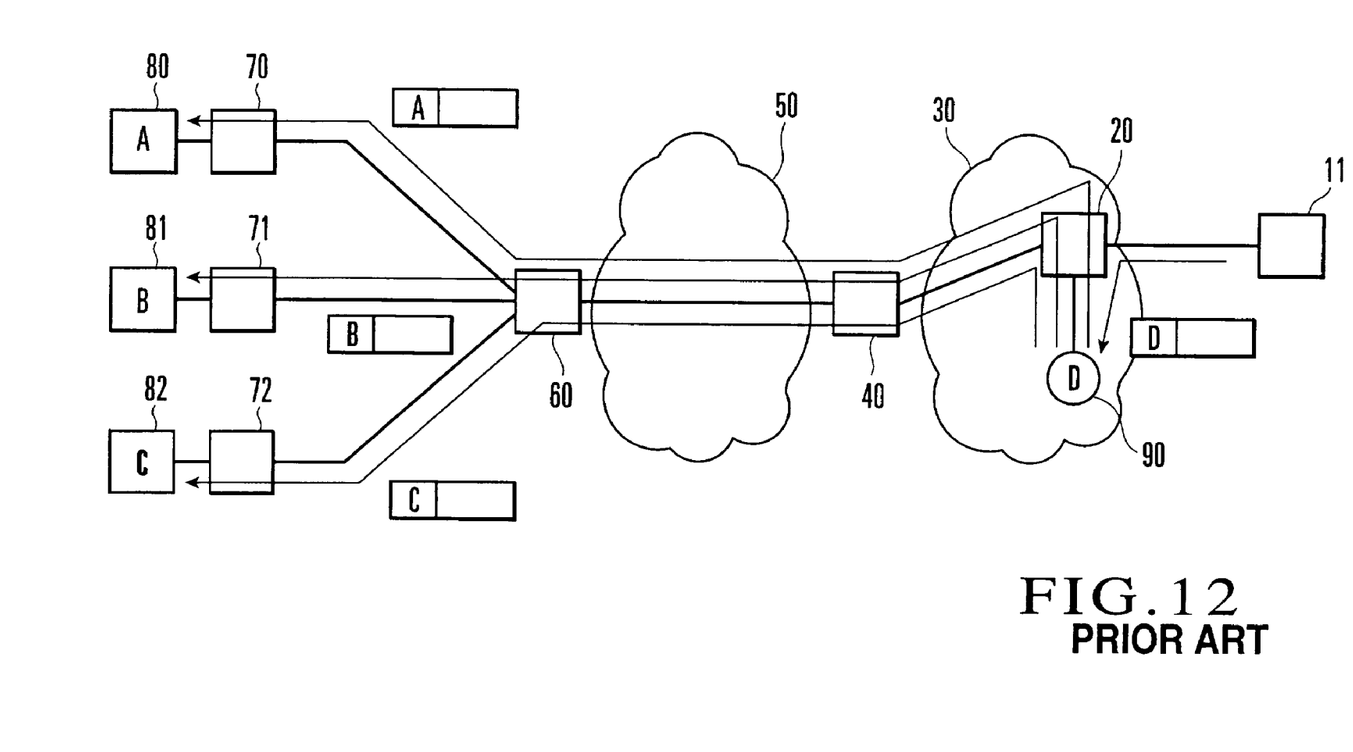
FIG. 12 is a view showing a conventional data distribution system using a splitter.

In a conventional multicast distribution scheme using a splitter shown in FIG. 12, a splitter 90 is arranged in an IP network 30 near a server 11. Since this splitter 90 copies/distributes a single packet to clients (A) to (C) that are reserved in advance, a router 20 and the IP network 30 need not cope with multicast. In addition, the content server 11 only needs to transmit a signal packet having a D address to the splitter 90. In this scheme, however, the problem that the band of the relay line up to a BAS 40, ATM access network 50, and xDSL accommodation apparatus 60 is wasted is not solved.

As described above, for the broadcast-type live content stream distribution services, the methods using IP multicast or a splitter are proposed to reduce wasteful use of the relay line in general stream distribution. However, both the methods have problems in capital investment and effective use of the relay line.

SUMMARY OF THE INVENTION

It is an object of the present invention to provide an xDSL accommodation apparatus, multicast distribution system, and data distribution method, which reduce the load by effectively using the band of a relay line, thereby reducing capital investment for multicast distribution.

It is another object of the present invention to provide an xDSL accommodation apparatus, multicast distribution system, and data distribution method, which make it possible to bring a new contract form for broadcast-type live content distribution between a client and a broadcaster.

In order to achieve the above objects, according to the present invention, there is provided an xDSL accommodation apparatus comprising an xDSL interface which interfaces an xDSL (any types of Digital Subscriber Line) to which each of a plurality of clients is connected, an exchange switch which exchanges a packet transmitted/received between a content server and a client, and a cache server which temporarily stores a content received from the content server through a network, wherein the cache server comprises copy/distribution means for copying and distributing the stored content to distribute the same content to the plurality of clients.

DESCRIPTION OF THE PREFERRED EMBODIMENTS

The present invention will be described below in detail with reference to the accompanying drawings.

Figure 1:
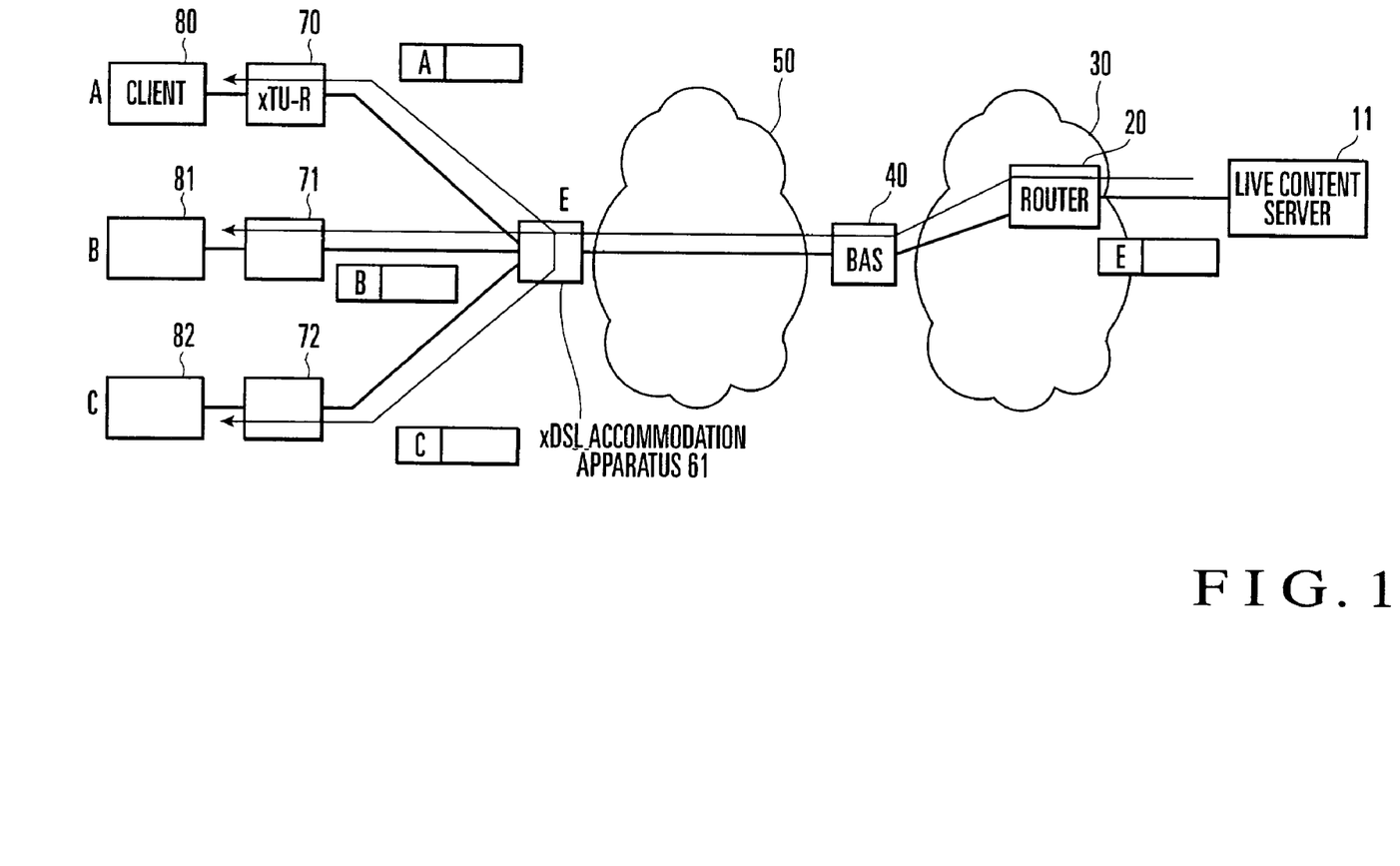
FIG. 1 is a view showing the configuration of a multicast distribution system according to the first embodiment of the present invention.

FIG. 1 shows a multicast distribution system according to the first embodiment of the present invention. A live content server 11 and clients 80, 81, and 82 are connected through a router 20, IP network 30, BAS 40, ATM access network 50, xDSL accommodation apparatus 61, and xTU-Rs 70, 71, and 72. The live content server 11 transmits a packet addressed to the xDSL accommodation apparatus 61. The xDSL accommodation apparatus makes copies of the packet as many as the clients and transmits the copies as packets addressed to the clients 80, 81, and 82.

An "xDSL accommodation apparatus" means a device which distributes data to subscribers through a subscriber line in a digital subscriber line system and is generally installed on an xDSL provider side. A "client" means, in subscribers of a digital subscriber line, a person who receives data distribution using a data distribution system of the present invention on the basis of, e.g., a contract.

Figures 2A, 2B:
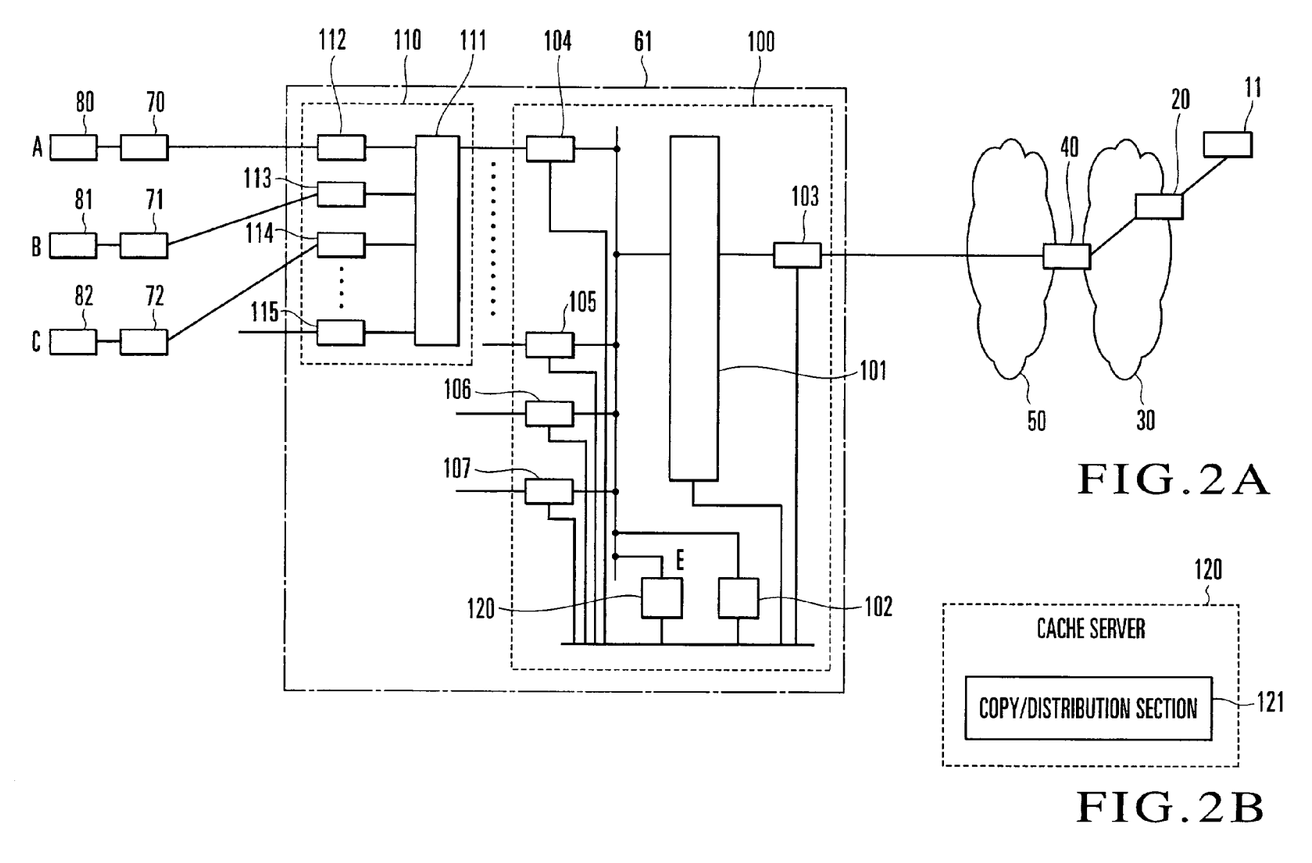
FIG. 2A is a block diagram of an xDSL accommodation apparatus shown in FIG. 1.
FIG. 2B is a functional block diagram of a cache server shown in FIG. 2A.

As shown in FIG. 2A, the xDSL accommodation apparatus 61 comprises an xDSL line control package 100 and xDSL line interface package 110. The xDSL line control package 100 comprises an ATM switch 101 for exchanging a packet transmitted from the BAS 40, a backbone-side interface 103, line package interfaces 104, 105, 106, and 107, a cache server 120 for temporarily storing a packet transmitted from the live content server 11, and a processor 102 for controlling these components. As shown in FIG. 2B, the cache server 120 has a copy/distribution section 121 which executes a packet copy/distribution function.

The xDSL line interface package 110 comprises an MUX/DMUX (Multiplex/Demultiplex) 111 for transmitting/receiving a packet to/from the xDSL line control package 100, and xDSL line interfaces 112, 113, 114, and 115.

The data distribution operation in the above-described multicast distribution system will be described next with reference to FIG. 3. In this embodiment, the live content provider distributes a content to addresses registered in advance in the xDSL accommodation apparatus regardless of client requests.

An ID (identification) management table 123 of contract clients is stored in the cache server 120 in the xDSL accommodation apparatus 61 as the destinations of a packet to be multicast-distributed. In addition to VPI/VCI (Virtual Path Identifier/Virtual Channel Identifier), the local PHY (physical) ID and IP address in the apparatus are registered in advance in the ID management table. An ID is registered by the operator/manager of the xDSL accommodation apparatus 61 when a client subscribes. Alternatively, a contract client makes Web-base service provisioning from his own terminal.

If the content distribution time is predetermined, the content server 11 registers in advance a distribution schedule registration table 11a in which the distribution time is recorded, and automatically starts distribution at the registered time in accordance with the table 11a. The content server 11 may start distribution at arbitrary time. In distributing a content, the content server transmits a packet to the address of the cache server 120 in the xDSL accommodation apparatus 61 (route R1). The packet transmitted from the content server is received by the cache server 120 and buffered into a predetermined region. The copy/distribution section 121 in the cache server 120 makes a necessary number of copies of the buffered packet, rewrites the destinations of the packets to distribution destinations registered in advance, and transmits the packets (routes R2, R3, and R4).

According to this embodiment, any wasteful use of the relay line from the content server 11 to the ATM switch 101 can be avoided by using the copy/distribution function of the cache server 120.

Figures 3, 4:
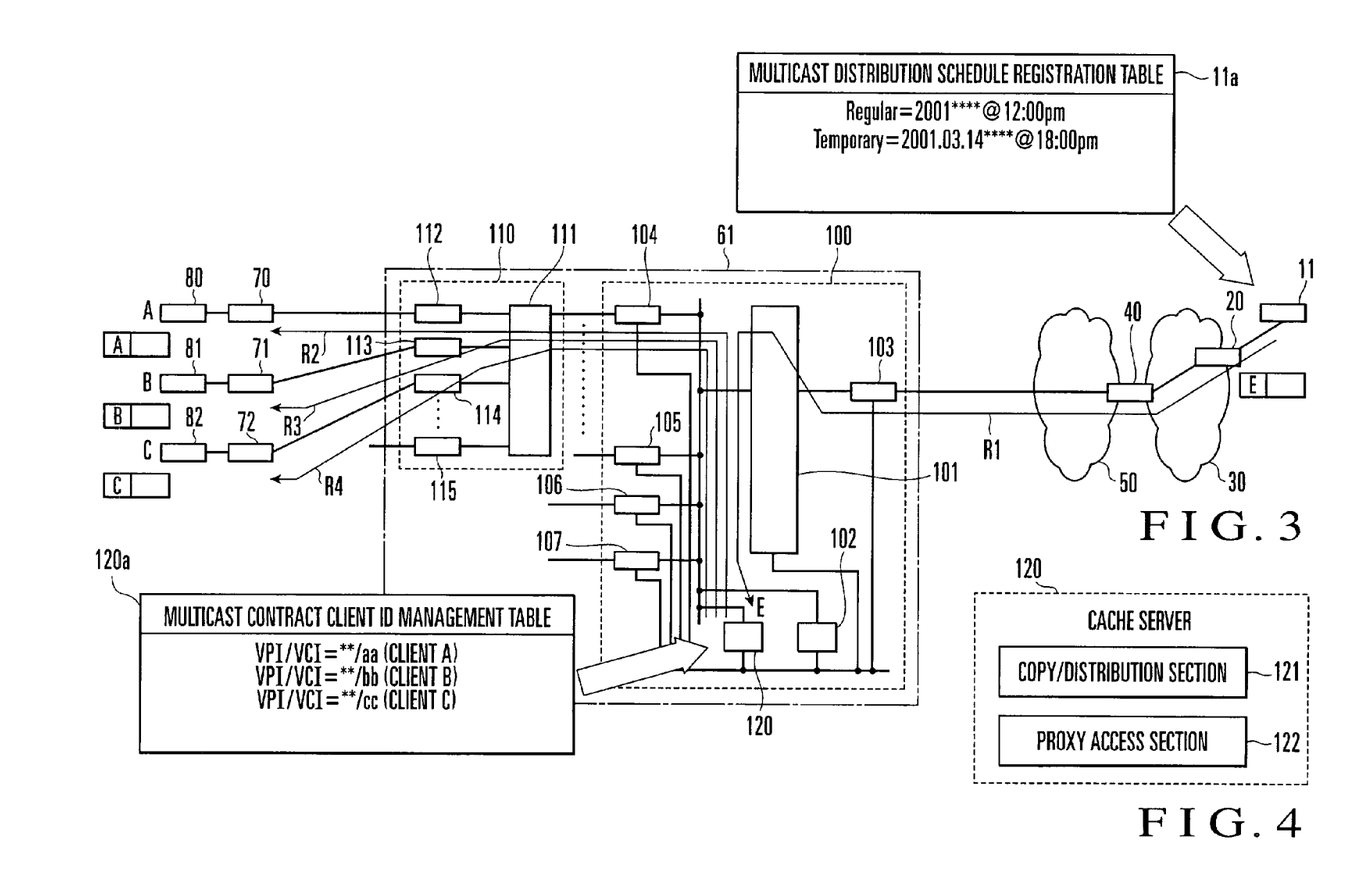
FIG. 3 is a view showing the data distribution path of the multicast distribution system shown in FIG. 1.
FIG. 4 is a block diagram of a cache server of a multicast distribution system according to the second embodiment of the present invention.

FIGS. 4 to 7 show a multicast distribution system according to the second embodiment of the present invention. The overall arrangement of this embodiment is the same as in the first embodiment shown in FIGS. 1 and 2, and a description thereof will be omitted. In the second embodiment, as shown in FIG. 4, a cache server 120 has a copy/distribution section 121 which executes a packet copy/distribution function and a proxy access section 122 which executes proxy access to content servers 11 and 12.

In this configuration, the proxy access section 122 of the cache server 120 executes proxy access to the content servers 11 and 12 on the basis of connection requests from clients 80 to 82 whereby a live content provider distributes a content to the cache server 120, i.e., a destination registered in advance in an xDSL accommodation apparatus 61. In this case, if the connection requests from the clients 80 to 82 are for the same content as that already received by another client, the copy/distribution section 121 of the cache server 120 makes copies of a packet and distributes them.

Figure 5:
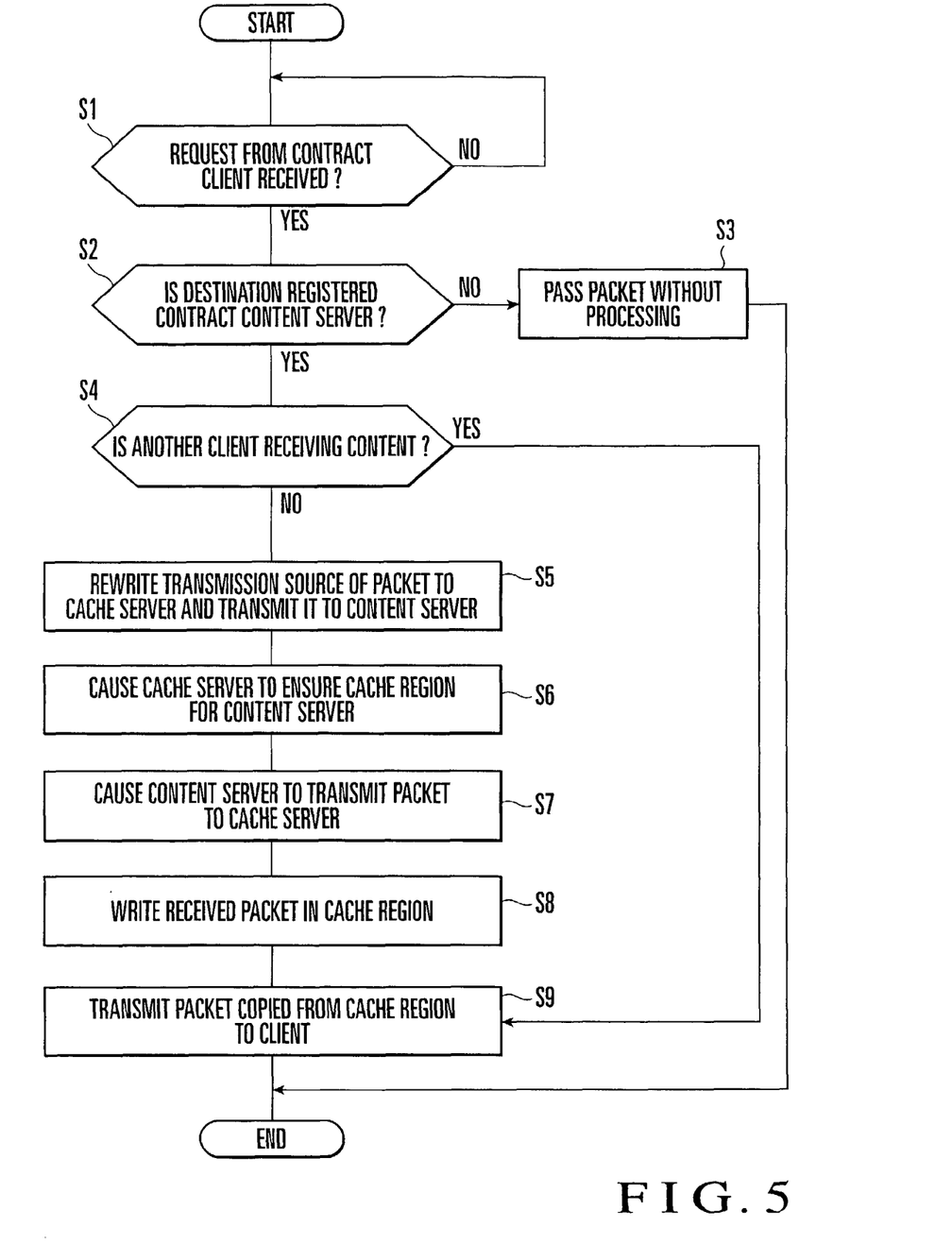
FIG. 5 is a flow chart showing the data distribution operation of the multicast distribution system according to the second embodiment of the present invention.

The operation of the multicast distribution system according to this embodiment will be described with reference to the flow chart shown in FIG. 5. Pieces of information of contract clients and contract content servers are input to the cache server 120 in the xDSL accommodation apparatus 61 in advance.

In this state, the xDSL accommodation apparatus 61 determines whether a packet from a contract client to the outside of the xDSL accommodation apparatus 61 is received (step S1). If YES in step S1, the xDSL accommodation apparatus 61 checks whether the destination of the packet is a contract content server (step S2). If NO in step S2, the packet is transmitted to the outside without any processing (step S3).

If YES in step S2, the xDSL accommodation apparatus 61 checks whether another client is already receiving that content (step S4). If NO in step S4, the transmission source of the packet is rewritten to the cache server 120 by the proxy access section 122 of the cache server 120, and the packet is transmitted to the contract content server (step S5). At this time, the cache server 120 ensures a cache region for reception from the contract content server (step S6). The contract content server returns a packet to the cache server 120 as the transmission source (step S7). The packet received by the cache server 120 is written in the cache region ensured in step S6 (step S8).

The copy/distribution section 121 of the cache server 120 makes a copy of the packet written in the cache region and transmits the packet to the contract client that has transmitted the connection request (step S9). If YES in step S4, the copy/distribution section 121 of the cache server 120 makes a copy of the packet in an already ensured cache region and distributes the packet without transmitting the packet to the contract content server.

Figures 6A, 6B:
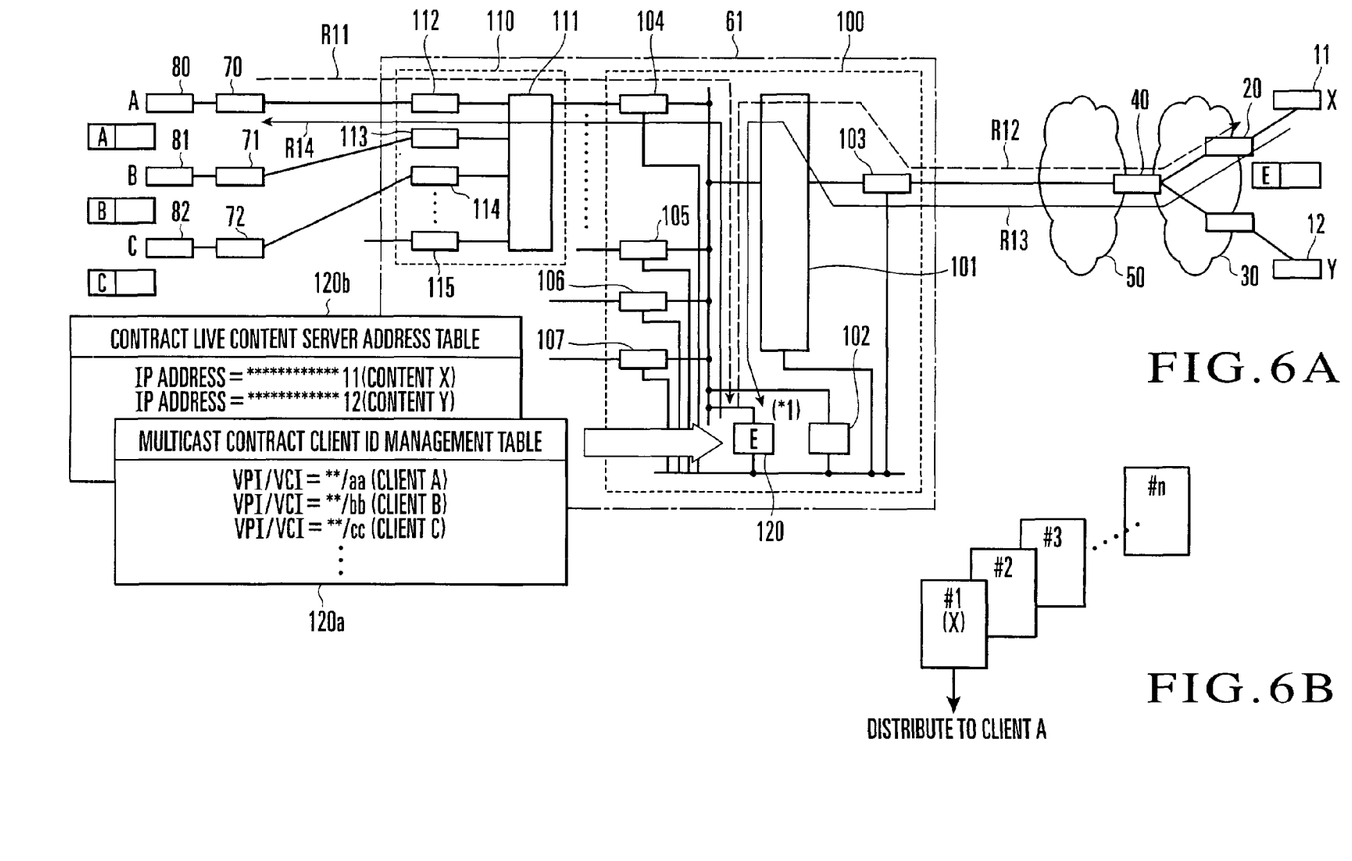
FIG. 6A is a view showing the data distribution path of the multicast distribution system according to the second embodiment of the present invention.
FIG. 6B is a view showing the cache planes of the cache server.
Figures 7A, 7B:
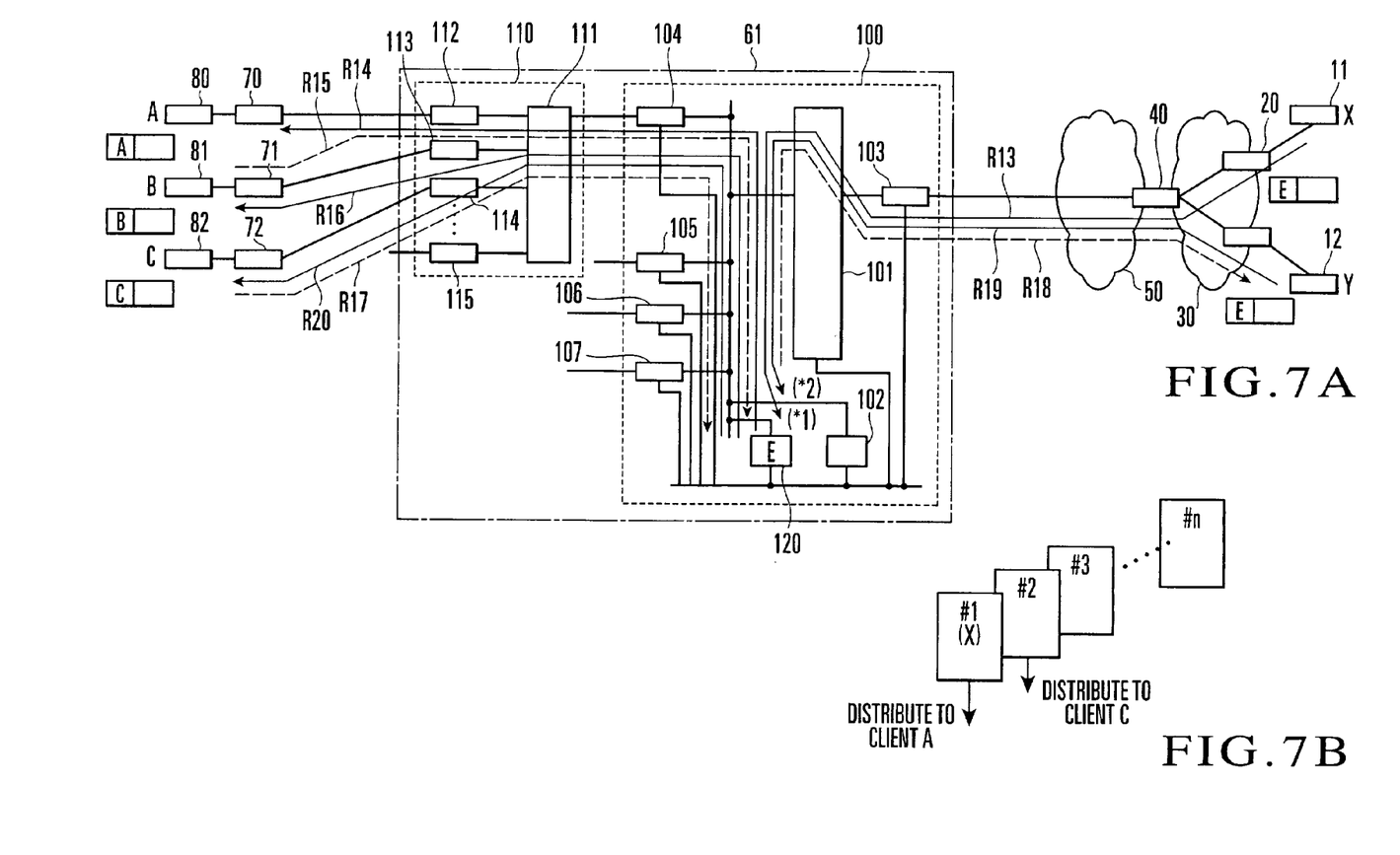
FIG. 7A is a view showing the data distribution path of the multicast distribution system according to the second embodiment of the present invention.
FIG. 7B is a view showing the cache planes of the cache server.

FIGS. 6A and 7A show data distribution paths in the second embodiment. An ID management table 120a (VPIs/VCIs, local PHYs in apparatuses, IDs, IP addresses, and the like are recorded) of contract clients as the destinations of a packet to be multicast-distributed and an address table 120b of contract live content servers are registered in advance in the cache server 120 in the xDSL accommodation apparatus 61. These pieces of information are registered by the operator/manager of the xDSL accommodation apparatus 61 when a client subscribes. Alternatively, a contract client makes Web-base service provisioning from his own terminal.

Referring to FIG. 6A, a packet transmitted from a contract client temporarily passes through the cache server 120. The cache server 120 determines whether the packet is addressed to a contract content server. If the packet is addressed to a contract content server, the cache server 120 rewrites the transmission source address to the address of the cache server 120 and executes proxy access to the content server. For example, assume that the first client (A) 80 requests stream distribution of the content server (X) 11 (route R11). In this case, since the transmission source ID is the client (A) 80, the packet is temporarily passed through the cache server 120, and the cache server 120 checks the destination address.

When it is determined that the destination is the contract server (X) 11, the cache server 120 executes proxy access to the content server (X) 11 (route R12). At this time, the cache server 120 assigns a cache plane for communication with the content server (X) 11. The cache plane is statically assigned when the address table is registered. Alternatively, a free cache plane is dynamically assigned. In this example, cache plane #1 shown in FIG. 6B is dynamically assigned. When a cache plane is dynamically assigned, operation is possible even when

[number of address tables in content server]≧[number of cache planes]

Hence, cache planes can efficiently be used.

When the content server (X) 11 performs stream distribution to the address of the cache server 120, the packet reaches the cache server 120 having an E address through a router 20, IP network 30, BAS 40, ATM access network 50, and a backbone-side interface 103 and ATM switch 101 in the xDSL accommodation apparatus 61 (route R13) and is buffered in cache plane #1 assigned in advance. The cache server 120 makes a copy of the content and distributes it to the client (A) 80 (route R14).

As shown in FIG. 7A, when the client (B) 81 requests stream distribution of the content server (X) 11 (route R15), the packet is temporarily passed through the cache server 120 because the transmission source ID is the client (B) 81, and the cache server 120 checks the destination address. If it is determined that the destination of the packet is a contract content server, and it is the content server (X) 11 from which a content is being received by the client (A) 80, the cache server 120 makes a copy of the content for cache plane #1 and distributes the content to the client (B) 81 without accessing the content server (X) 11 (route R16). In this way, when another client accesses the content server (X) 11, the content is copied and distributed from cache plane #1.

When the client (C) 82 requests stream distribution of the contents server (Y) 12 (route R17), and any other clients are receiving no content from the contents server (Y) 12, the cache server 120 executes proxy access to the contents server (Y) 12 (route R18). A packet transmitted from the contents server (Y) 12 is buffered in newly assigned cache plane #2 shown in FIG. 7B (route R19) and then distributed to the client (C) 82.

If another client is receiving the content, the cache server 120 distributes data copied from an already assigned cache plane. In this way, any wasteful use of the relay line can be avoided by using the copy/distribution function (copy/distribution section 121) and proxy access function (proxy access section 122) of the cache server 120. Additionally, a connection request from a client is not wastefully sent to the eternal network of the xDSL provider.

The third embodiment of the present invention will be described next. In the first embodiment, a multicast contract client is identified, and then, a content is distributed. In the third embodiment, a content is distributed to all xDSL subscribers without having any contract client management table.

An example of a service that can be supposed in the first and third embodiments of the present invention is push distribution of specific regional information to subscribers connected to a given xDSL accommodation apparatus. Since the content provider needs to only distribute to the xDSL accommodation apparatus the information addressed to a number of subscribers, the traffic load on the relay line from the content server to the xDSL accommodation apparatus can be suppressed.

An example of a service that can be supposed in the second embodiment of the present invention is a case wherein a number of clients simultaneously access a content server to see a goal scene in the World Cup. In the conventional system, the traffic load on both the content server and the relay line bursts. In the present invention, however, when the copy/distribution function and proxy access function of the cache server in the multicast distribution system are used, the traffic on the content server and relay line can be suppressed. Note that such a live content may be distributed to a plurality of clients simultaneously or sequentially in accordance with requested times.

Examples of contract forms related to the business method using the multicast distribution systems of the first to third embodiments of the present invention will be described below.

Contract Form 1:

A business form in which an xDSL provider makes a live content distribution contract (pay or free) with a live content provider by a package deal, and the xDSL provider provides a distribution service (pay or free) to arbitrary contract clients.

Contract Form 2:

A business form in which an xDSL provider makes a live content distribution contract (pay or free) for contract clients with a live content provider, and the xDSL provider provides a distribution service (pay or free) to the contract clients.

Contract Form 3:

A business form in which an xDSL provider makes a live content distribution contract (pay or free) with a live content provider by a package deal, and the xDSL provider provides a distribution service (free) to all clients.

Contract Form 4:

A business form in which a live content provider makes a live content distribution contract (pay or free) with an xDSL provider by a package deal, and the live content provider provides a distribution service (pay or free) to arbitrary contract clients.

Contract Form 5:

A business form in which a live content provider makes a live content distribution contract (pay or free) for contract clients with an xDSL provider, and the live content provider provides a distribution service (pay or free) to the contract clients.

Contract Form 6:

A business form in which a live content provider makes a live content distribution contract (pay or free) with an xDSL provider by a package deal, and the live content provider provides a distribution service (free) to all clients.

Figure 8:
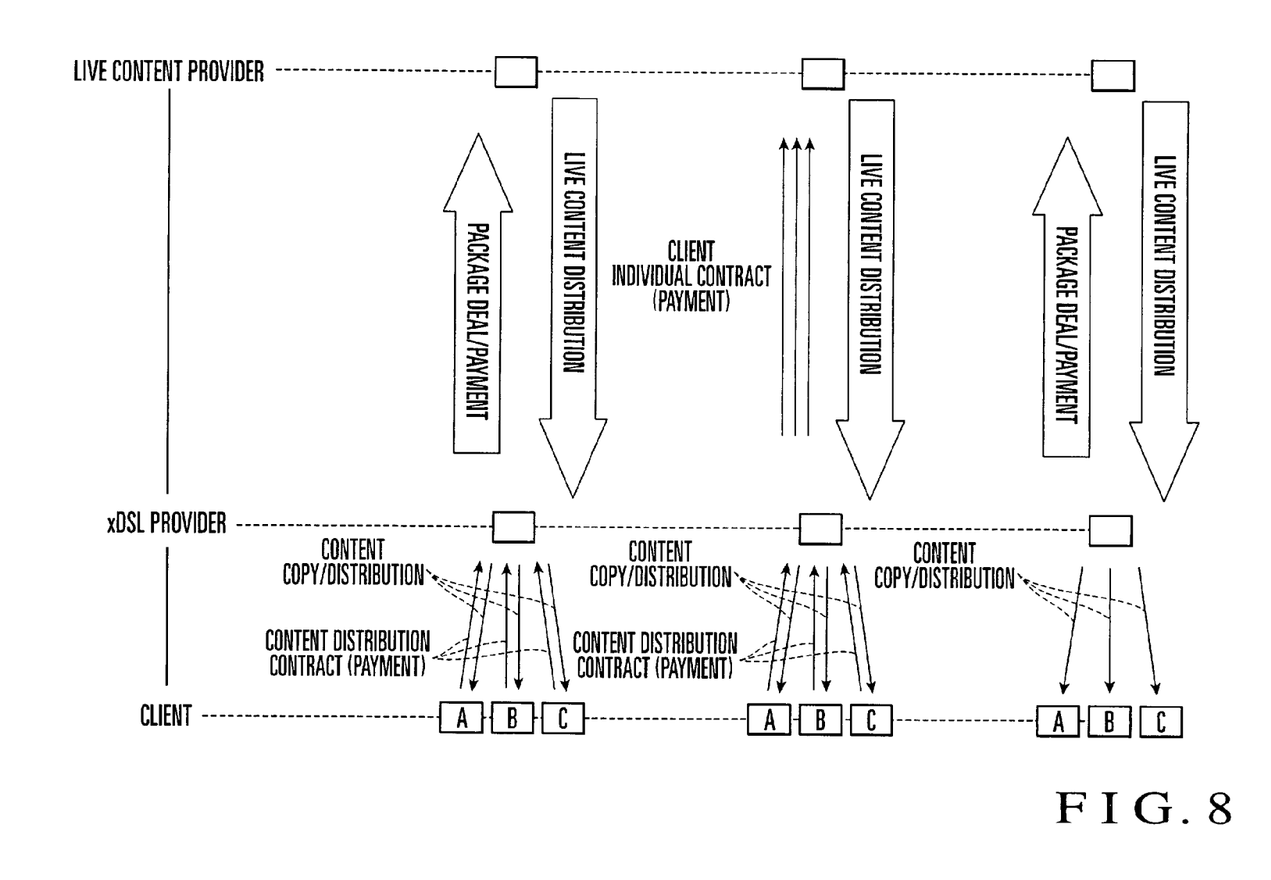
FIG. 8 is a view showing a live content distribution contract form using the present invention.
Figure 9:
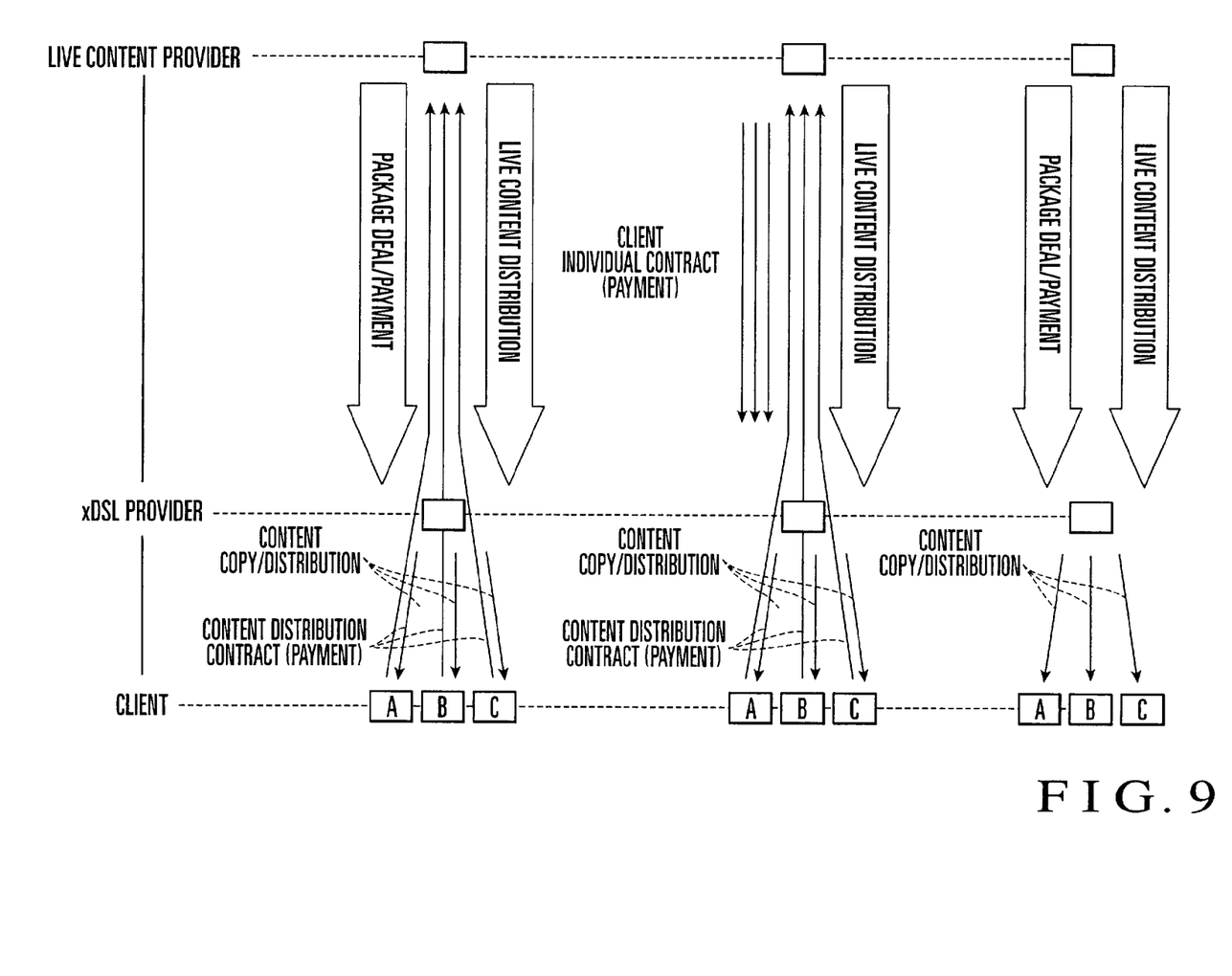
FIG. 9 is a view showing another live content distribution contract form using the present invention.

FIGS. 8 and 9 show the live content data paths and contracts in the above contract forms. FIG. 8 shows a form in which the principal of the contract is an xDSL provider, and the charge for live content distribution is paid to the xDSL provider. FIG. 9 shows a form in which the principal of the contract is a live content provider, and the charge for live content distribution is paid to the live content provider.

The present invention has been described above on the basis of the preferred embodiments. The xDSL accommodation apparatus, multicast distribution system, and data distribution method of the present invention are not limited to the above embodiments. An xDSL accommodation apparatus, multicast distribution system, and data distribution method for which various changes and modifications are made for the above embodiments are also incorporated in the present invention.

As has been described above, according to the present invention, in stream distribution of a broadcast-type live content, the copy/distribution function is implemented by the xDSL accommodation apparatus close to clients, thereby effectively utilizing the relay line.

In addition, when the proxy function is prepared together with the copy/distribution function, the load on the content server and the traffic load on the backbone side including the ATM switch section in the xDSL accommodation apparatus can be reduced. Accordingly, the ISP (Internet Service Provider; especially live content provider) and xDSL provider can reduce the capital investments for the content server and xDSL accommodation apparatus, respectively.

The functions and effects of the above-described present invention will be described in more detail.

In the xDSL accommodation apparatus and multicast distribution system of the present invention, a cache server function is prepared to copy and distribute a received packet, and the same content is distributed to a plurality of clients. Since the cache server function transmits a received packet to a plurality of clients, any wasteful use of the relay line for content distribution can be prevented.

In the xDSL accommodation apparatus and multicast distribution system of the present invention, a proxy function is prepared to execute a proxy access request from a client to a content server. When proxy access is executed for the client, reception requests from a plurality of clients to a single content server need not be transmitted. Hence, the network load on the content server side can be reduced.

In the xDSL accommodation apparatus and multicast distribution system of the present invention, an ID management table of contract clients is registered inside in advance, and clients for multicast are identified on the basis of the management table. When the ID management table of the contract clients is prepared, access from a contract party to a contract content server can be identified.

In the xDSL accommodation apparatus and multicast distribution system of the present invention, an address management table of contract content servers is registered inside in advance, and a content from a content server is multicast-distributed to contract clients on the basis of the management table. When the address management table of the contract content servers is prepared, distribution to the contract clients becomes possible.

In the xDSL accommodation apparatus and multicast distribution system of the present invention, a content received by connection between a cache server function and a content server, which is established as a result of an access request from the first client, is distributed to the second and subsequent clients upon receiving access requests to the same content server. Since the copy/distribution function and proxy access function are prepared, any wasteful use of the relay line for content distribution can be prevented.

In the xDSL accommodation apparatus and multicast distribution system of the present invention, a plurality of cache regions are prepared, and free cache regions are statically or dynamically assigned to packets received from a plurality of content servers. Since the plurality of cache regions are prepared, when a plurality of clients are receiving contents from a plurality of content servers, the contents can be efficiently copied and distributed.

In the xDSL accommodation apparatus and multicast distribution system of the present invention, when the number of address tables of content servers is larger than the number of cache regions, free cache regions are dynamically assigned. When the cache regions are dynamically assigned, the cache regions can be efficiently used, and contents can be efficiently copied and distributed.

What is claimed is:

1. An xDSL accommodation apparatus comprising:
an interface to which each of a plurality of client devices is connected;
an exchange switch to exchange content transmitted/received between a content server of a plurality of content servers and a client device of the plurality of client devices; and
a cache server to temporarily store content received from the content server of the plurality of content servers through a network, the cache server comprising:
a copy/distribution processor to copy and distribute the stored content to the plurality of client devices,
one or more address management tables in which addresses of the plurality of content servers are registered, and where the cache server is to multicast-distribute the content from the content server of the plurality of content servers to a client device of the plurality of client devices based on information in the one or more address management tables; and
a plurality of cache regions, where the cache server is to statically or dynamically assign a free cache region, of the plurality of free cache regions, to the content received from the content server of the plurality of content servers, and where the cache server is able to dynamically assign the free cache region when a number of the one or more address management tables is larger than a number of cache regions of the plurality of cache regions.

2. The apparatus according to claim 1, where said cache server further comprises a proxy access processor to rewrite a transmission source ID of a request for content, transmitted from one of the plurality of clients to said cache server, to identify the content server.

3. The apparatus according to claim 1, where said cache server further comprises an ID management table in which an ID of a client device of the plurality of client devices is registered, and where said cache server identifies a client for multicast by looking up an entry in said ID management table.

4. The apparatus according to claim 1, where said copy/distribution processor is further to:
distribute first content, stored as a result of an access request from a first client device, of the plurality of client devices, to the first client device, upon retrieval of the first content from a particular content server of the plurality of content servers, and
distribute the first content, stored as the result of the access request from the first client device, to a second client device, of the plurality of client devices, without re-retrieving the first content from the particular content server.

5. A multicast distribution system comprising:
an accommodation apparatus to which each of a plurality of client devices is connected through a digital subscriber line, said accommodation apparatus comprising a cache server to temporarily store content; and
a content server to transmit content to a client device, of the plurality of client devices, through a network and said accommodation apparatus in response to a request from the client device,
where said cache server comprises:
one or more address management tables in which an address of the content server is registered, and where said cache server is to multicast-distribute the content, from the content server, to client device based on information in the one or more address management tables;

a plurality of cache regions, where the cache server is to statically or dynamically assign a free cache region, of the plurality of cache regions, to the content received from the content server, and where the cache server is able to dynamically assign the free cache region when a number of the one or more address management tables is larger than a number of the plurality of cache regions, a table in which identifiers of client devices, of the plurality of client devices, to be subjected to multicast distribution is stored, and a copy/distribution processor to copy and distribute the stored content to the client devices, of the plurality of client devices, whose identifiers are stored in the table.

6. The multicast distribution system of claim 5, where the copy/distribution processor is further to:
distribute first content, stored as a result of an access request from a first client device, of the plurality of client devices, to the first client device, upon retrieval of the first content from the content server, and
distribute the first content, stored as the result of the access request from the first client device, to a second client device, of the plurality of client devices, without re-retrieving the first content from the content server.

7. The multicast distribution system of claim 5, further comprising:
an exchange switch to exchange the content between the content server and the client device.

8. The multicast distribution system of claim 5, where the cache server further comprises a proxy access processor to rewrite a transmission source ID of a request for content transmitted from the client to the cache server.

9. The multicast distribution system of claim 8, where the proxy access processor is further to rewrite the transmission source ID to identify the cache server.

10. A multicast distribution system comprising:
an accommodation apparatus to which each of a plurality of client devices is connected through a digital subscriber line, said accommodation apparatus comprising a cache server to temporarily store received content,
said system transmitting content to a client device, of the plurality of client devices, through a network and said accommodation apparatus in response to a request from the client device,
where said cache server comprises:
one or more address management tables in which an address of a content server is registered, and where said cache server is to multicast-distribute the content from the content server to the client device based on information in the one or more address management tables;
a plurality of cache regions, where the cache server is to statically or dynamically assign a free cache region, of the plurality of cache regions, to the content received from a content server, and where the cache server is able to dynamically assign the free cache region when a number of the one or more address management tables is larger than a number of the plurality of cache regions,
a copy/distribution processor to copy and distribute the content to said plurality of client devices, and
a proxy access processor to rewrite a transmission source ID of a request for content transmitted from the client device to said cache server, and
where said copy/distribution processor is further to:
distribute first content, stored as a result of an access request from a first client device, of the plurality of client devices, to the first client device, upon retrieval of the first content from the content server, and
distribute the first content, stored as a result of the access request from the first client device, to a second client device, of the plurality of client devices.

11. The multicast distribution system of claim 10, where the cache server further comprises an ID management table in which an ID of a client device of the plurality of client devices is registered.

12. The multicast distribution system of claim 10, further comprising:
an exchange switch to exchange the content between the content server and the plurality of client devices.

13. The multicast distribution system of claim 10, where the proxy access processor is further to rewrite the transmission source ID to identify the cache server.

14. The multicast distribution system of claim 10, where the copy/distribution processor is further to distribute the first content to the second client device without forwarding a request for the first content to the content server.

15. A multicast distribution system comprising:
an accommodation apparatus to which each of a plurality of client devices is connected through a digital subscriber line, said accommodation apparatus comprising a cache server to temporarily store received content,
said system to transmit content to a client device, of the plurality of client devices, through a network and said accommodation apparatus in response to a request from the client device,
where said cache server comprises:
one or more address management tables in which an address of a content server is registered in advance, and where said cache server is to multicast-distribute the content from the content server to the client device based on information in the one or more address management tables;
a plurality of cache regions, where the cache server is to statically or dynamically assign a free cache region, of the plurality of cache regions, to the content received from a content server, and where the cache server is able to dynamically assign the free cache region when a number of the one or more address management tables is larger than a number of the plurality of cache regions, and
a copy/distribution processor to copy content data received from the content server in response to a request from the client device and distribute the content to all of the client devices of the plurality of client devices.

16. The multicast distribution system of claim 15, further comprising:
an exchange switch to exchange the content between the content server and the client device.

17. The multicast distribution system of claim 15, where the cache server further comprises a proxy access processor to rewrite a transmission source ID of a request for content transmitted from the client device to the cache server.

18. The multicast distribution system of claim 17, where the proxy access processor is further to rewrite the transmission source ID to identify the cache server.

19. The multicast distribution system of claim 15, where the cache server further comprises an ID management table in which an ID of a client device of the plurality of client devices is registered.

* * * * *